(12) United States Patent
Jurjanz et al.

(10) Patent No.: US 8,444,523 B2
(45) Date of Patent: May 21, 2013

(54) BIASING DEVICE

(75) Inventors: Ramon Jurjanz, Erlangen (DE); Tomas Smetana, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 236 days.

(21) Appl. No.: 13/000,875

(22) PCT Filed: Jun. 26, 2009

(86) PCT No.: PCT/EP2009/058020
§ 371 (c)(1),
(2), (4) Date: Dec. 22, 2010

(87) PCT Pub. No.: WO2010/000674
PCT Pub. Date: Jan. 7, 2010

(65) Prior Publication Data
US 2011/0100780 A1      May 5, 2011

(30) Foreign Application Priority Data
Jul. 3, 2008   (DE) .......................... 10 2008 031 512

(51) Int. Cl.
*F16H 48/20* (2012.01)
(52) U.S. Cl.
USPC ....................................................... 475/231

(58) Field of Classification Search
USPC .... 74/329, 330, 331, 340; 475/231; 192/93 A
See application file for complete search history.

(56) References Cited

U.S. PATENT DOCUMENTS

| | | | |
|---|---|---|---|
| 5,485,904 A | 1/1996 | Organek et al. | |
| 5,505,285 A | 4/1996 | Organek | |
| 5,620,072 A | 4/1997 | Engle | |
| 2004/0188212 A1* | 9/2004 | Weilant | 192/35 |
| 2009/0260945 A1* | 10/2009 | Martini et al. | 192/93 A |

FOREIGN PATENT DOCUMENTS

| | | |
|---|---|---|
| DE | 10 2004 015 271 | 3/2007 |
| DE | 10 2005 053 555 | 8/2007 |
| WO | 03076827 A | 9/2003 |

* cited by examiner

*Primary Examiner* — David D Le
*Assistant Examiner* — David J Hlavka
(74) *Attorney, Agent, or Firm* — Lucas & Mercanti, LLP

(57) ABSTRACT

Disclosed is a biasing device comprising a first ramp disc and a second ramp disc, a plurality of ramp contours being formed in one side of an annular surface of each of said ramp discs. Through a slewing of one of the two ramp discs relative to the other, non-slewing ramp disc about an axis, the rolling elements ascend and/or descend along the ramp contours. At least the first ramp disk, the cage and the second ramp disc are inserted into a retaining pot that is connected rotationally fast to a housing through at least one retaining element. For axial guidance, a plurality of rolling elements is arranged between the retaining pot and the non-slewing ramp disc.

25 Claims, 12 Drawing Sheets

BIASING DEVICE

This application is a 371 of PCT/EP2009/058020 filed Jun. 26, 2009, which in turn claims the priority of DE 10 2008 031 512.5 filed Jul. 3, 2008, the priority of both applications is hereby claimed and both applications are incorporated by reference herein.

FIELD OF THE INVENTION

The invention concerns a biasing device. In particular, the invention concerns a biasing device comprising a first ramp disc and a second ramp disc, a plurality of ramp contours being configured in one side of an annular surface of each of said ramp discs. A plurality of rolling elements is arranged between the ramp contours of the first ramp disc and of the second ramp disc such that, within the biasing device, through a slewing of one of the two ramp discs about an axis relative to the respective other ramp disc, which is a non-slewing disc, the rolling elements ascend and/or descend along the ramp contours. The rolling elements are retained for rolling in a cage.

BACKGROUND OF THE INVENTION

Biasing devices of the pre-cited type are used in transmissions of automotive vehicles, in particular, for enabling an actuation of a friction clutch in a drive train of an automotive vehicle. Possible fields of use of a biasing device are double clutches, differentials with torque vectoring or power dividers. In all cases, a stack of discs is actuated (compressed) with the help of an axial biasing device. One of the ramp discs is driven by an electric motor having either a spur gear or a worm drive. An axial biasing device is likewise used in bevel gear differentials for biasing multi-disc clutches of the heterodyne steps.

The unpublished German patent application (applicant company's reference: E2008015) discloses a biasing device comprising a first ramp disc and a second ramp disc both of which are configured with a plurality of ramp contours on an inner side of an annular surface of the ramp discs, each ramp contour comprising a first ramp and a second ramp, so that at least one rolling element is arranged between the first and the second ramp disc, such that, within the biasing device, through a slewing of at least one of the two ramp discs relative to the respective other ramp disc, the rolling elements ascend and/or descend along the ramp contours. These ramp discs are configured such that, between the side of the annular surface of the ramp discs not comprising any ramp contours, and the adjoining elements of each of the ramp discs, a plurality of hollow spaces is formed.

German patent specification DE 10 2005 053 555 B3 discloses an axial adjusting device in the form of a ball-ramp arrangement. The axial adjusting device comprises two discs centered on a common axis, at least one of these discs being axially supported and the other, axially displaceable, and at least one of which discs can be rotatably driven. Both discs comprise on their front end surfaces facing each other, the same plurality of ball grooves extending in circumferential direction, so that the two discs are mounted through balls as rolling elements.

U.S. Pat. No. 5,485,904 likewise discloses a biasing device whose ramp discs are arranged for rotation relative to each other through balls as rolling elements.

U.S. Pat. No. 5,620,072 also discloses a biasing device for a multi-disc clutch whose ramp discs are likewise arranged for rotation relative to each other through balls as rolling elements.

German patent specification DE 10 2004 015 271 B4 discloses a torque transmitting device. In this case, the rolling elements and the thrust bearing are arranged on a pitch circle that has the same diameter. The rolling elements used are balls.

It is the object of the invention to provide a low-cost, reduced-weight, low-friction biasing device with a reduced design space requirement that is configured for supporting radial and/or axial forces.

The above object is achieved with a biasing device having the features of claim 1.

An advantageous feature of the biasing device of the invention is that at least the first ramp disc, the cage and the second ramp disc are inserted in a retaining pot. The retaining pot is connected rotationally fast to a housing through at least one retaining element. For providing axial guidance, a plurality of rolling elements is arranged between the retaining pot and the non-slewing ramp disc.

At least the first ramp disc, the cage, the second ramp disc and the retaining pot are inserted into a rotating pot that cooperates with the slewing ramp disc. The rotating pot comprises a plurality of contours that cooperate with corresponding contours of the slewing ramp disc. It is of particular advantage if the contours of the rotating pot have a wedge-shaped configuration.

The retaining pot itself has a radially extending circumferential wall in which a raceway is formed for each of the rolling elements. In addition, the non-slewing ramp disc likewise has a radially extending circumferential wall in which a raceway is likewise formed for each of the rolling elements. In this way, the non-slewing ramp disc and the retaining pot can be moved axially relative to each other with reduced friction. The raceways in the radially extending circumferential wall of the retaining pot and the raceways in the radially extending circumferential wall of the non-slewing ramp disc are arranged equally spaced from one another. Advantageously, three raceways are provided in each of said walls, one rolling element in the form of a ball being guided in respective associated raceways of the retaining pot and the non-slewing ramp disc.

Between the slewing ramp disc and the retaining pot is arranged a stop disc. Arranged likewise between the retaining pot and the rotating pot is an angled disc. An actuating element configured on the rotating pot enables the rotating pot to pivot about the axis. The actuating element is configured in the form of a toothed rack element. The actuating element is driven by an electric motor through which an axial movement of the biasing device is realized.

There are many possibilities of configuring the ramp contour. It is possible for each ramp contour to comprise a first ramp and a second ramp, which ramps are inclined toward each other and form in cross-section, the shape of a concave-angled triangle. A further possibility is for each ramp contour to have a substantially uniform running surface that has a constant inclination with respect to the axis of the biasing device. It is further possible for each ramp contour to have a substantially uniform running surface that has a variable inclination with respect to the axis of the biasing device. Ramp contours having a substantially uniform running surface have the advantage of providing an initial contact point and an end contact point for the rolling elements, an end stop for the rolling elements being formed at the end contact point. The end stop is configured at the lowest point of the raceway.

From the mechanical point of view, the best construction is obtained if three rolling elements are arranged uniformly spaced from one another between the two ramp discs, each of the two ramp discs also being configured with three ramp contours. The ramp contours and, consequently, also the rolling elements, are spaced at an angle of 120° from one another on the ramp discs.

For the production of the biasing device, it is advantageous if the two ramp discs are components made by cold shaping out of a sheet metal blank. Cold shaping of the sheet metal blank forms the ramp contours as well as the running surfaces for the rolling elements. Cold shaping further forms on the non-slewing ramp disc, the radially extending circumferential wall and the raceways for the rolling elements. The retaining pot and the rotating pot are also components made by cold shaping out of a sheet metal blank. At least the components of the ramp contours are hardened on the running surfaces for the rolling elements for rolling contact. The material of the sheet metal blanks is a cold-forming steel of the "16 MnCr 5" type. It is equally possible to use a cold-forming steel of the "C45" type as a material for the sheet metal blanks, the shaped sheet metal blanks being hardenable for the mechanical loading in the biasing device.

The rolling elements between the first and the second ramp disc can be configured as balls, as rollers or as frustums of a cone.

The first ramp disc, the cage, the second ramp disc, the stop disc, the retaining pot, the angled disc and the rotating pot of the biasing device are mounted together to form a pre-assembled unit. The non-slewing ramp disc is fixed relative to the rotating pot in direction of the axis of the biasing device by calking.

Examples of embodiment of the invention and their advantages will be described in the following with reference to the appended figures.

Figure 12:
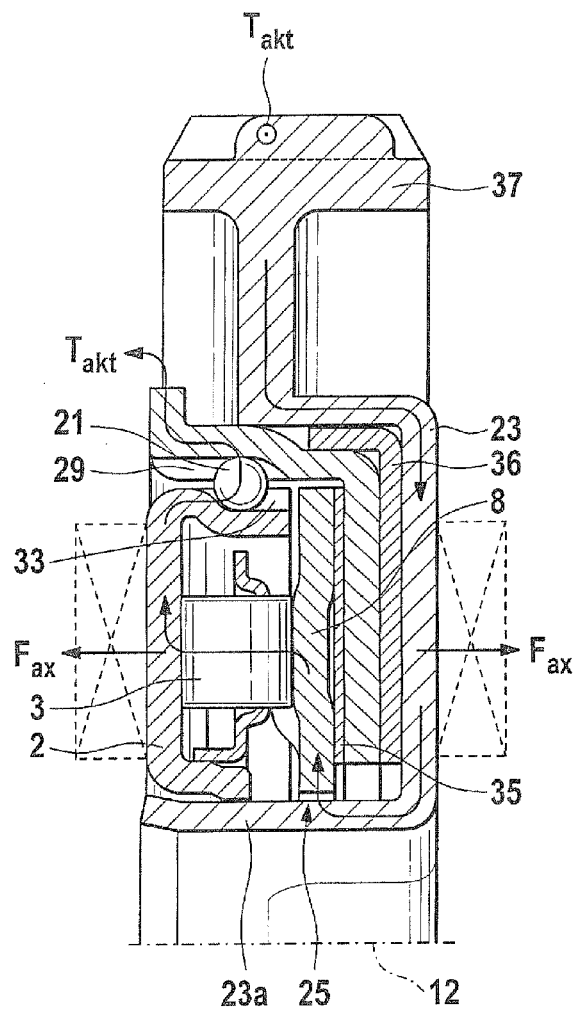
Figure 13:
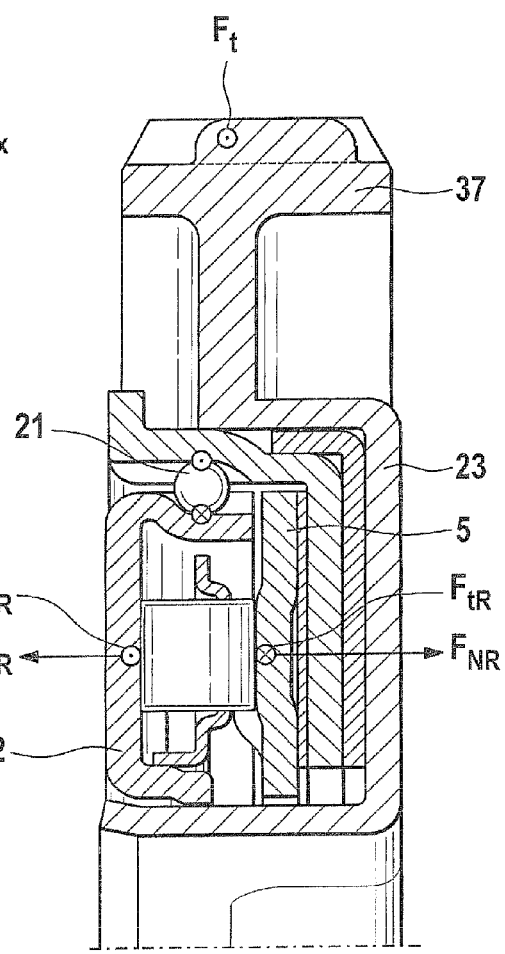
Figure 14:
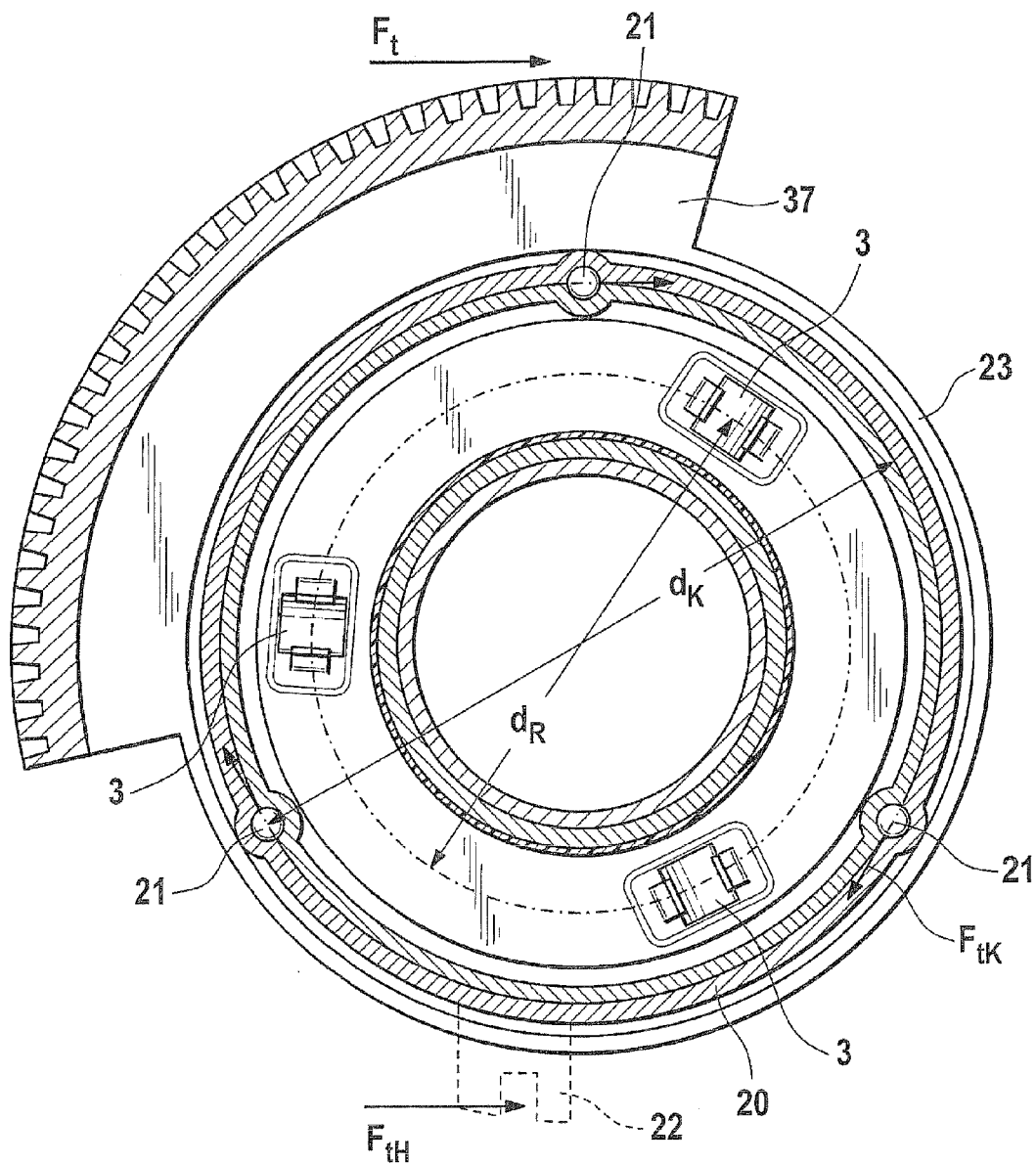

FIG. 12 elucidates the principle of functioning of the biasing device of the invention;

FIG. 13 shows in a schematic illustration, the forces acting in the biasing device of the invention and FIG. 14 shows a schematic plan view of the biasing device of the invention and the active forces.

Identical references will be used for identical or identically acting elements of the invention. Further, for the sake of clarity, only those references will be shown in the individual figures that are necessary for the description of the figure. The forms of embodiment illustrated only constitute examples of how the device of the invention or the method of the invention could be configured and do not constitute any restricting limitations.

Although the following description of the biasing device 1 refers to the use of three rollers as rolling elements 3 arranged between the ramp discs 2, 5, this is not to be regarded as a limitation of the invention. As already made clear in the foregoing description, three to five rollers may be arranged between the first and the second ramp disc 2, 5.

Figure 1:
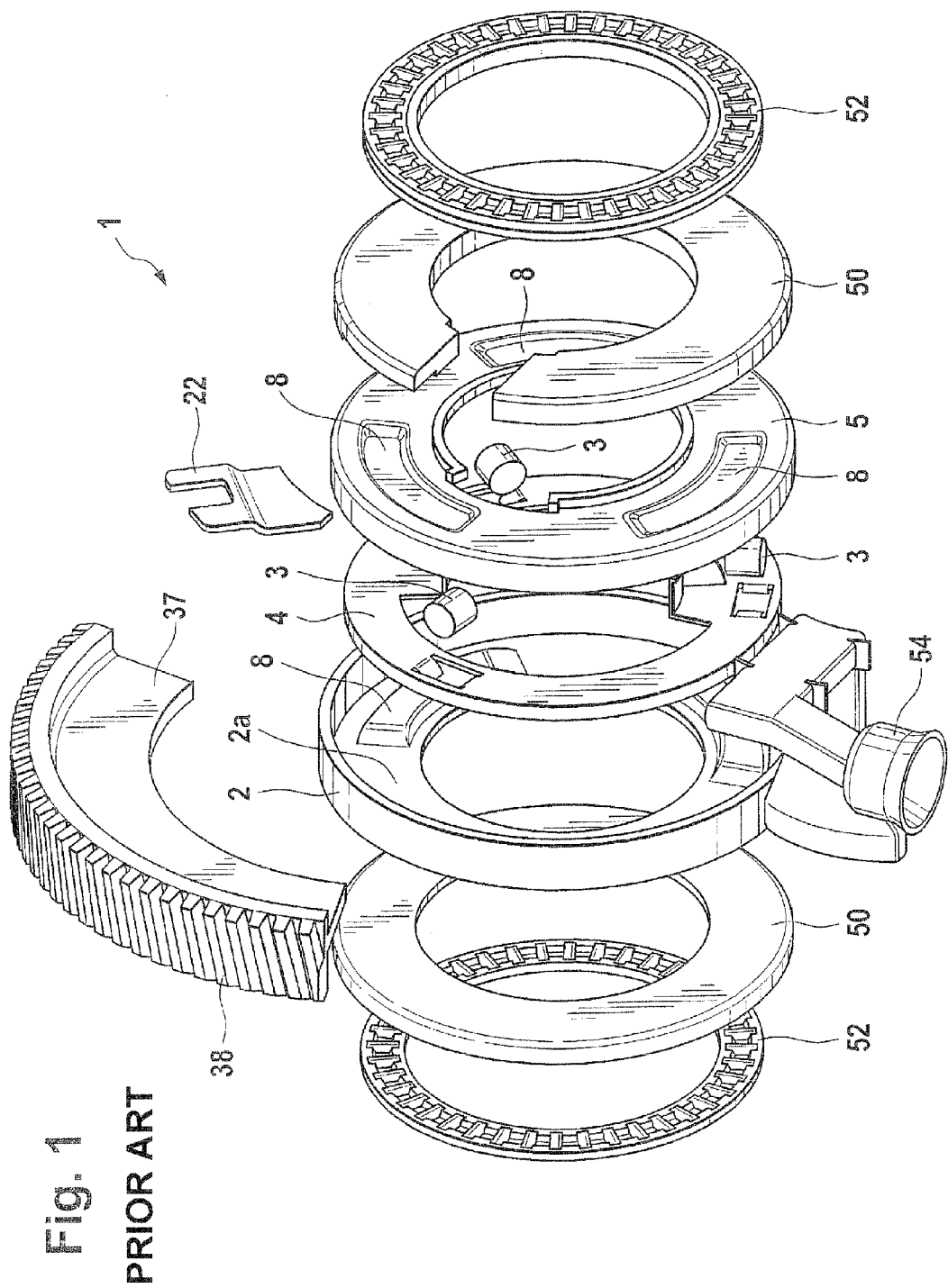
FIG. 1 shows an exploded illustration of a biasing device of the prior art, which functions after the RLF principle.

FIG. 1 shows a perspective view of an exploded illustration of a biasing device 1 known from the prior art. The biasing device 1 is made up substantially of a first ramp disc 2, a second ramp disc 5 and a cage 4 for rolling elements 3. Both ramp discs 2 and 5 comprise a plurality of ramp contours 8 in one side of a respective annular surface 2a, 5a of the ramp discs 2 and 5. Between the respective ramp contours 8 of the first ramp disc 2 and the second ramp disc 5 is arranged, in each case, one rolling element 3. The rolling elements 3 are retained in the cage 4. The first ramp disc 2 is connected to an actuating element 37 through which the first ramp disc 2 is capable of slewing. Suitable mechanical parts of the transmission engage the actuating element 37 which is configured on its outer contour with a toothing 38. In this form of embodiment, the actuating element 37 is made in the shape of a circular sector. It is obvious to a person skilled in the art that it is also possible to configure the actuating element 37 differently. Each of the first and the second ramp discs 2 and 5 is adjoined by a support disc 50 and each support disc 50 carries a thrust needle roller bearing 52. Further, a retaining element 22 that can be connected to a housing (not shown) is connected to the non-slewing ramp disc 5. In addition, it is also possible to provide an oil passage 54.

Figure 2:
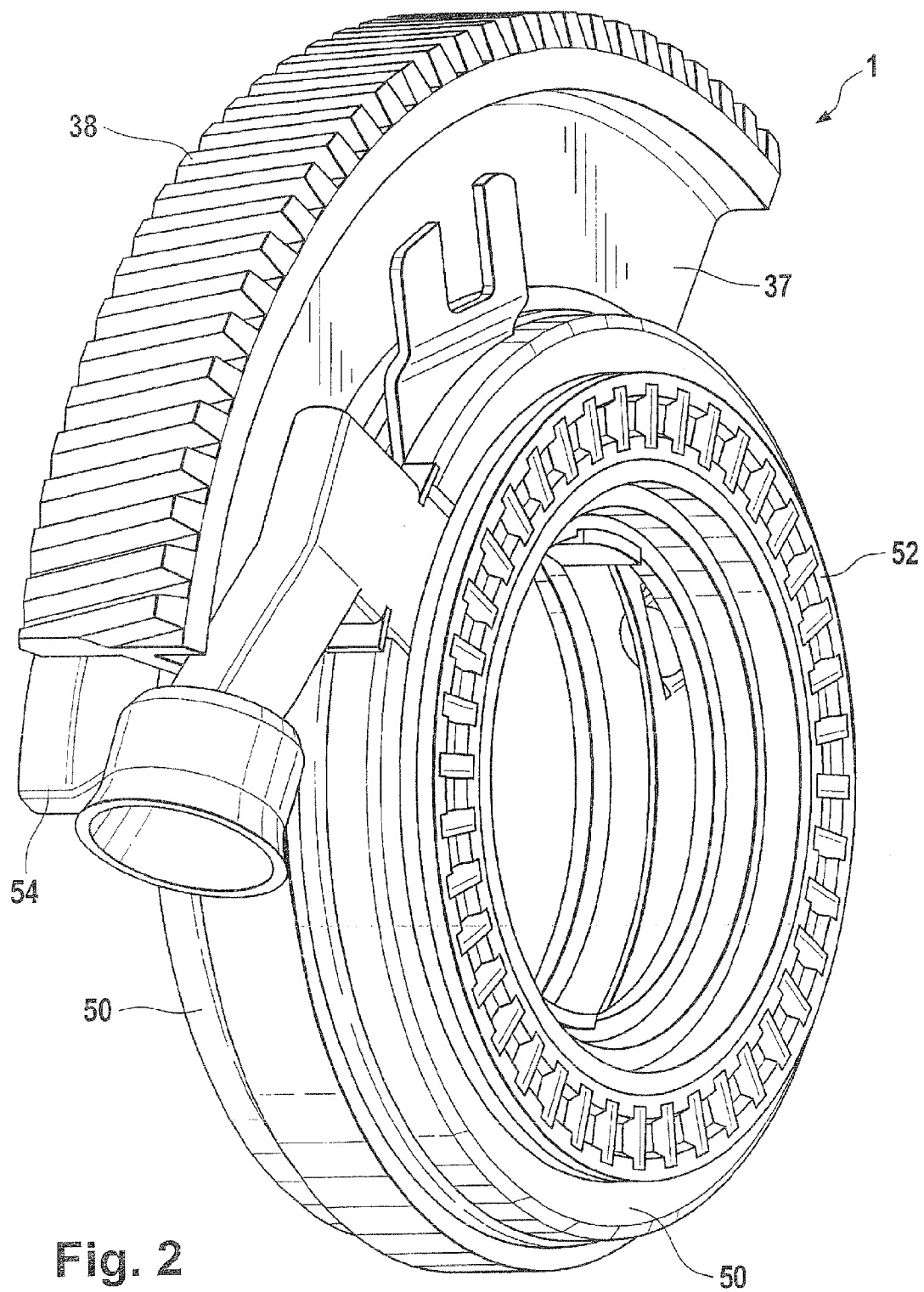
FIG. 2 shows the biasing device of FIG. 1 in a perspective view and as an assembled unit.

FIG. 2 shows the biasing device 1 of FIG. 1 in a perspective view and as an assembled unit. The actuating element 37, the oil passage 54, the support discs 50, the thrust needle roller bearings 52, the two ramp discs 2 and 5 and the cage 4 with the rolling elements 3 are mounted together to form a pre-assembled unit which can be installed as a unit into a transmission provided for this purpose.

Figure 3:
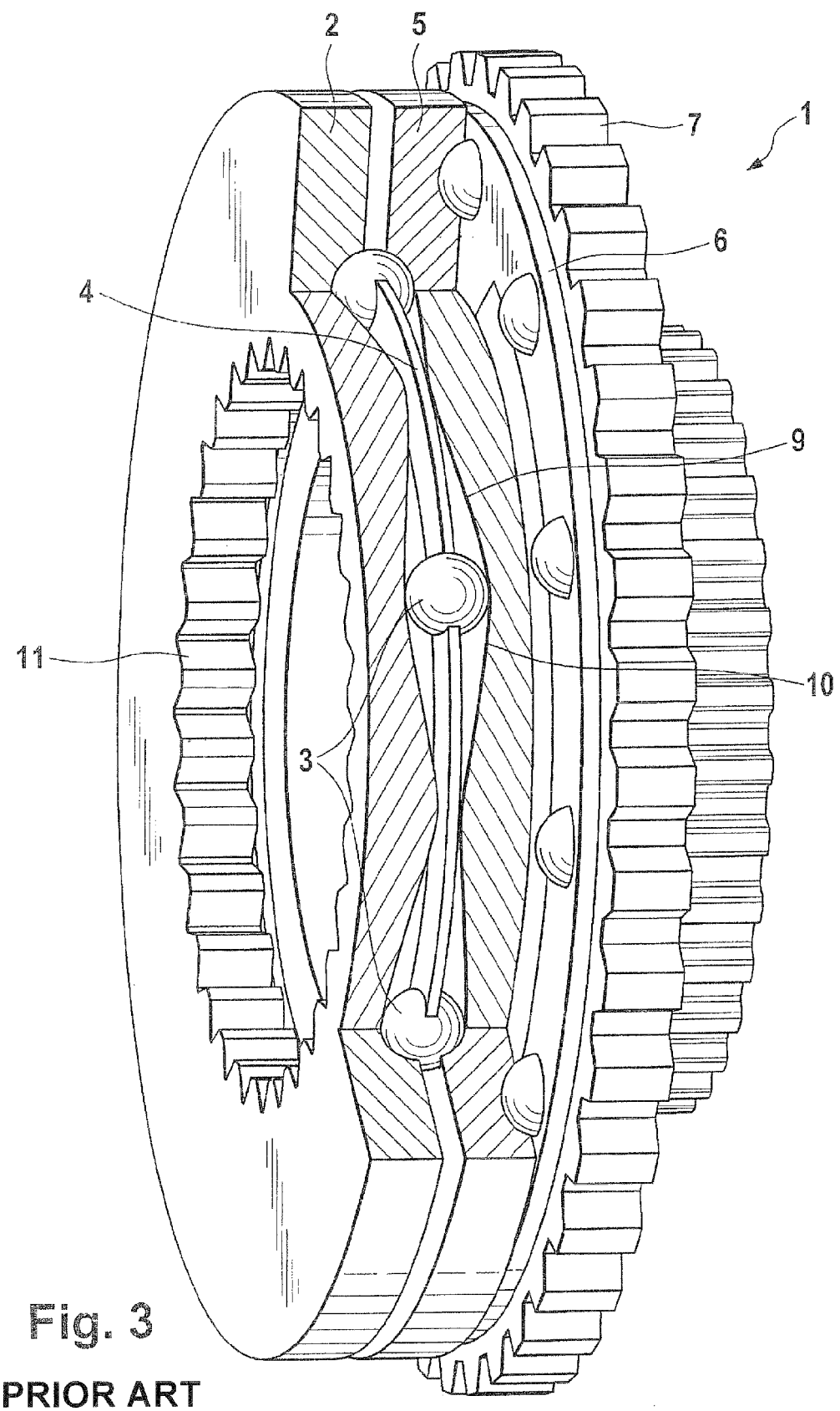
FIG. 3 shows a perspective view of another form of embodiment of a biasing device known from the prior art.

FIG. 3 shows a perspective view of another form of embodiment of a biasing device 1 known from the prior art. Some components of the device are shown partially in a sectional view for providing a better impression of the structure of the biasing device 1. As can be seen in this illustration, the biasing device 1 substantially comprises a first ramp disc 2, a cage 4 in which a plurality of rolling elements 3 (balls) is arranged, and a second ramp disc 5. The upper side of the second ramp disc 5 on which no ramps 9, 10 are stamped bears against the thrust bearing 6. The thrust bearing 6 is adjoined by the stop disc 7. Besides this, the first ramp disc 2 comprises, on its inner side, a toothing 11 which assures a torque-resistant engagement into a transmission shaft, not shown.

Figure 4:
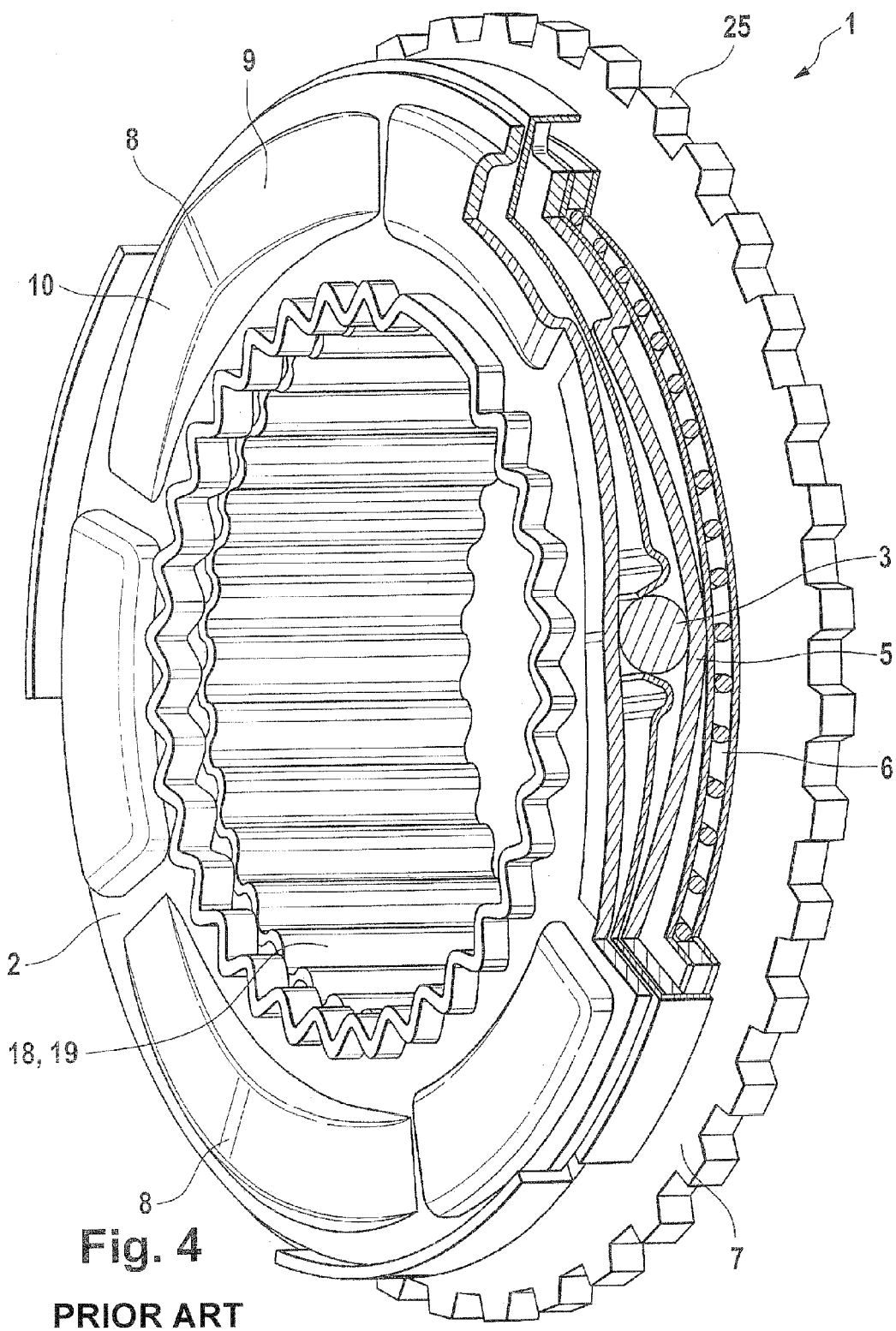
FIG. 4 shows a perspective view of a further form of embodiment of a biasing device known from the prior art.

FIG. 4 shows a perspective view of a further form of embodiment of a biasing device 1 known from the prior art. The first ramp disc 2 and the second ramp disc 5 are shown in a relative position in which the rolling element 3 is situated, in each case, at the lowest point of the ramp contour 8. Each ramp contour 8 comprises a first ramp 9 and a second ramp 10. The second ramp disc 5 is situated next to the thrust bearing 6. A cage 4 for retaining the rolling elements 3 retains at least the two ramp discs 2, 5 and the rolling elements 3 against one another by positive engagement. The sleeve 19 comprises a toothing for assuring a torque-resistant but axially sliding engagement with a shaft, not shown. The toothing 20 is formed by an undulatory sheet metal. The second ramp disc 5 is made optionally as a drawn, punched and stamped component out of a forging or sheet metal blank. Alternatively, the second ramp disc 5 can be extrusion molded out of blanks. The thrust bearing 6 is adjoined by stop disc 7. The stop disc 7 is preferably a punched and stamped component and comprises, both on its inside and outside, a toothing 25 for torque-resistant connections.

Figure 5:
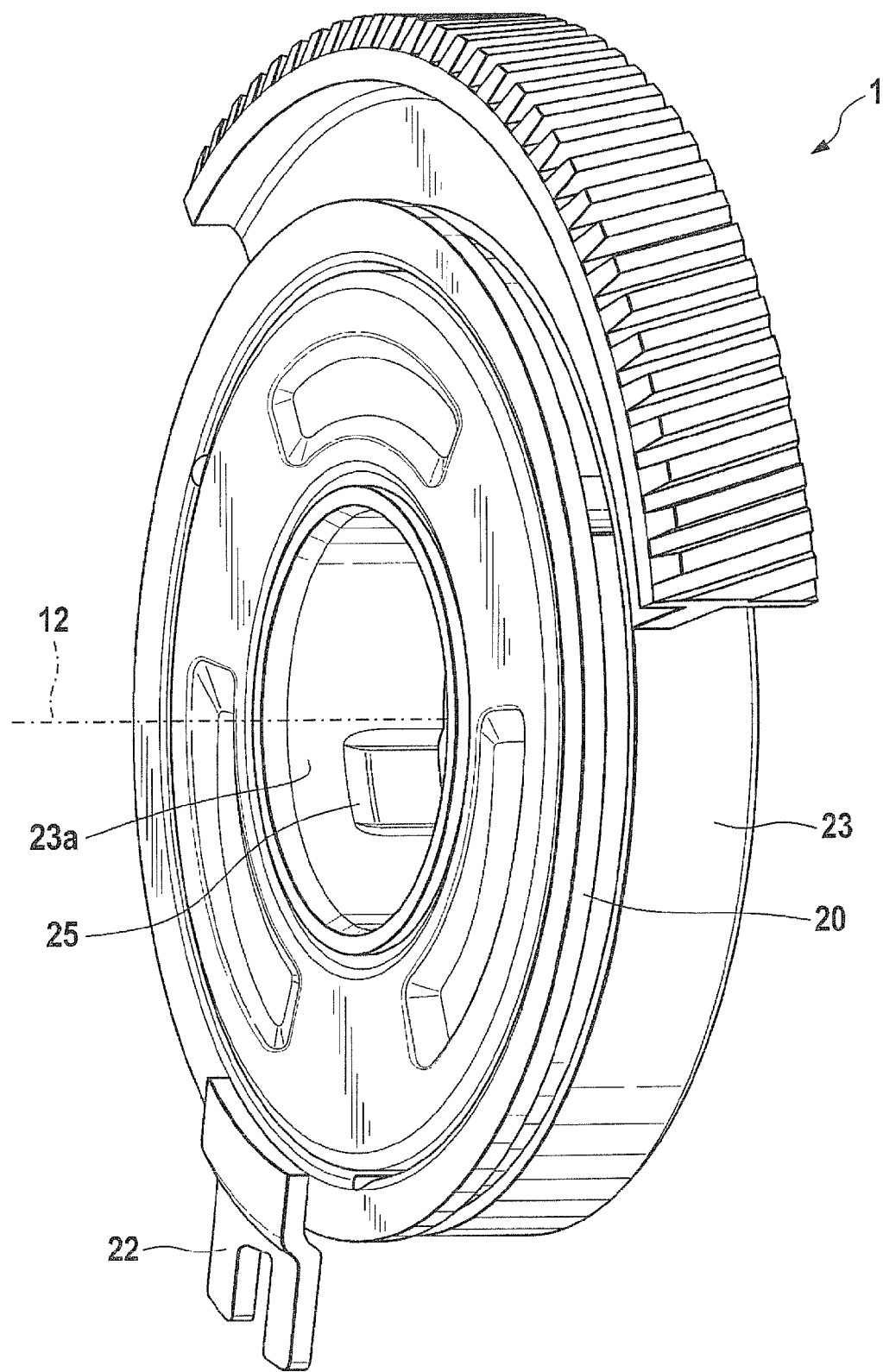
FIG. 5 shows a perspective view of a biasing device of the invention mounted together as a sub-assembly.

FIG. 5 shows a perspective view of a biasing device 1 of the invention mounted together as a sub-assembly. The first ramp disc 2 is inserted in a retaining pot 20. A retaining element 22 is formed on the retaining pot 20 and connected rotationally fast to a housing, (not shown). The housing is, e.g. the transmission housing in which the biasing device 1 of the invention is to be mounted. The retaining pot 20 is inserted together with the ramp discs in a rotating pot 23. The rotating pot 23 is configured with a plurality of contours 25 which cooperate with corresponding contours (not visible in this illustration) of the slewing ramp disc for effecting an axial stroke of the biasing device 1 when the rotating pot 23 is actuated. The contours 25 are configured on a cylinder 23a of the rotating pot 23, which cylinder is arranged symmetrically around the axis 12 of the biasing device. The cylinder 23a engages at least partially through a central circular relief of the two ramp discs 2 and 5 and of the retaining pot 20.

Figure 6:
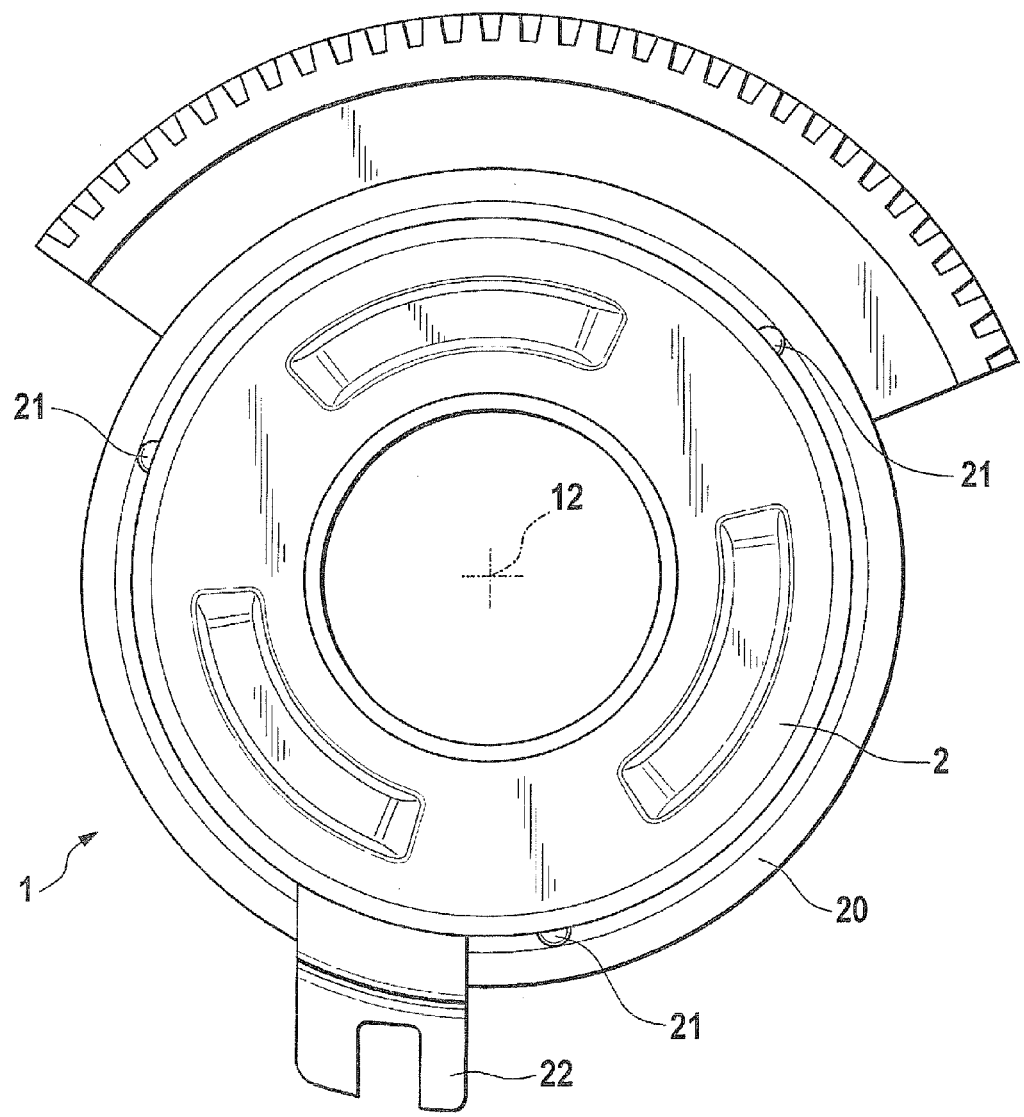
FIG. 6 shows a plan view of a biasing device of the invention mounted together as a sub-assembly.

FIG. 6 shows a plan view of a biasing device 1 of the invention mounted together as a sub-assembly. As already mentioned in the description of FIG. 5, a retaining element 22 is configured on the retaining pot 20 and is connected rotationally fast to a housing. In the form of embodiment of FIG. 6, the first ramp disc 2 is configured as a non-slewing ramp disc. To assure the non-slewing feature of the first ramp disc 2, at least one linear guide in direction of the axis 12 of the biasing device 1 is provided between the first ramp disc 2 and the retaining pot 20. The linear guide is realized by the fact that grooves are configured in pairs on the retaining pot 20 and on the first, non-slewing ramp disc 2, a plurality of rolling elements 21 being arranged in said grooves for reducing friction in direction of the axis 12. For this purpose, these rolling elements 21 are preferably balls.

Figure 7:
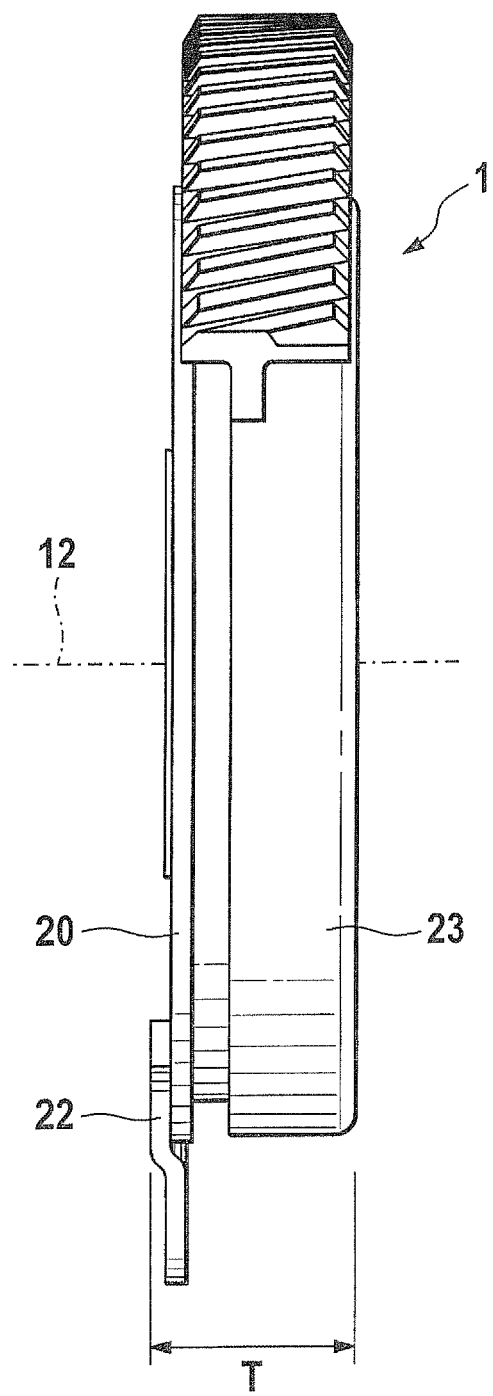
FIG. 7 shows a side view of a biasing device of the invention mounted together as a sub-assembly.

FIG. 7 shows a side view of a biasing device 1 of the invention mounted together as a sub-assembly. It can be clearly seen in this figure that the pre-assembled biasing device 1 has a small design depth T. In this way, less design space is required for installation of the biasing device 1 in a transmission or other similar structure. Further, a reduction of weight of the biasing device 1 is also achieved. All the components of the biasing device 1 of the invention are arranged around the axis 12 and form a pre-assembled unit.

Figure 8:
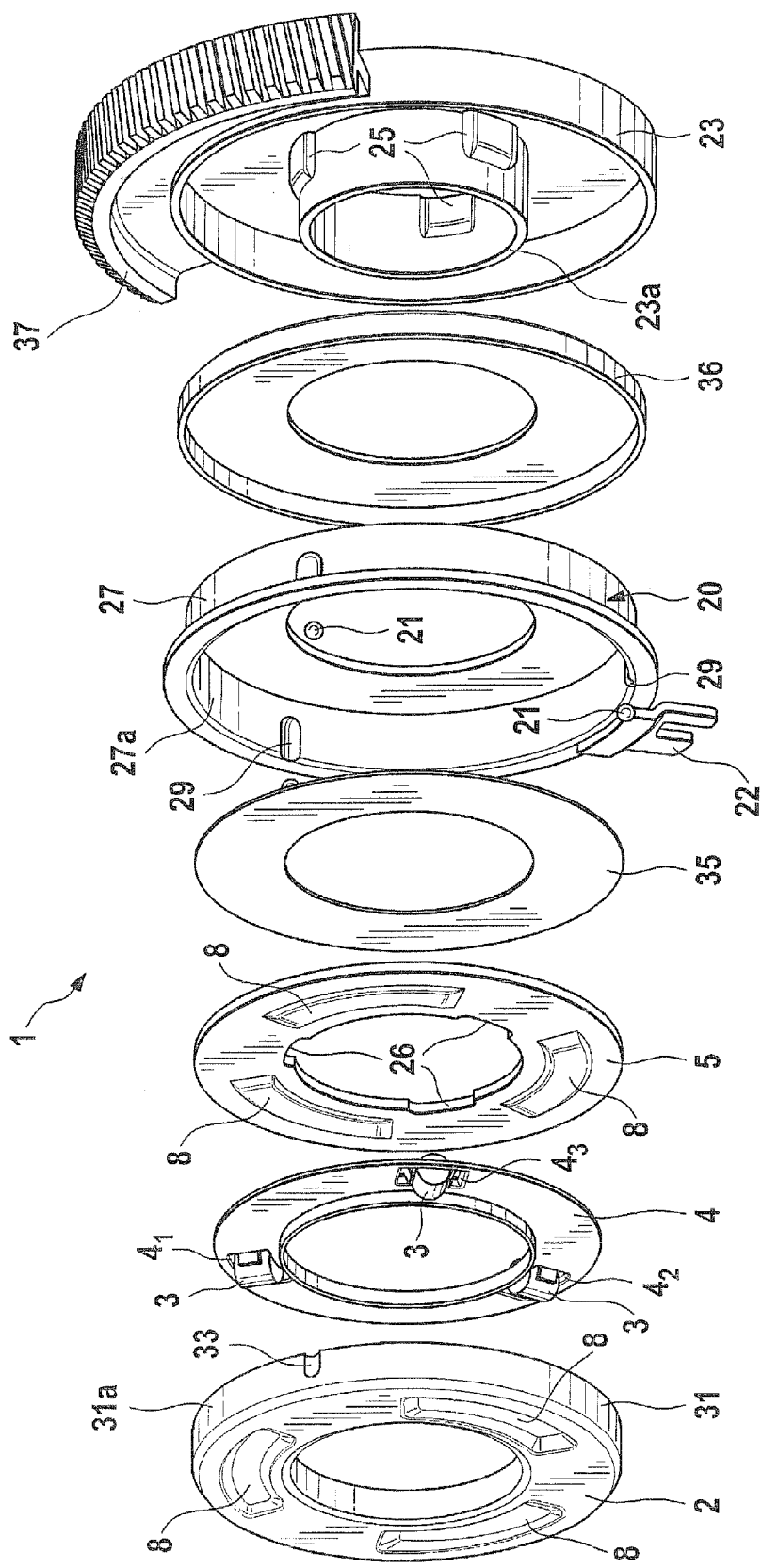
FIG. 8 shows an exploded view of the biasing device of the invention, which functions after the RLF principle.

FIG. 8 shows a perspective view of the exploded illustration of the biasing device 1 of the invention. As can be seen in this figure, the biasing device 1 of the invention according to this form of embodiment comprises a first ramp disc 2, a cage 4 and a second ramp disc 5. In the further description of the invention, the rolling elements 3 inserted into the cage 4 will be designated as rollers. In this embodiment, too, three ramp contours 8 are configured in each of the ramp discs 2 and 5. For a person skilled in the art it is obvious that the number of rolling elements 3 and ramp contours 8 mentioned in the description is not to be understood as a limitation of the invention. The cage 4 thus comprises three receptions $4_1$, $4_2$ and $4_3$ for the rolling bearings 3. In the form of embodiment represented in this figure, the rolling bearings 3 are configured as rollers. The cage 4 is adjoined on its two sides by the ramp discs 2 and 5. The ramp contours 8 can have various configurations. Their design will not be expressly dealt with here because it is not a subject matter of the invention. The ramp contour 8 is configured at least such that the raceway 10 thus formed is suitable for supporting the radial forces of the biasing device 1. The forces are introduced through the rotating pot 23 which, for actuating the biasing device 1, is pivoted through an actuating segment 37 in an adequate manner about the axis 2 of the biasing device 1.

For assembly, the first ramp disc 2, the cage 4 and the second ramp disc 5 are inserted into the retaining pot 20 which, in turn, is inserted into the rotating pot 23. A stop disc 35 is arranged between the slewing ramp disc (in the form of embodiment illustrated here, this is the second ramp disc 5) and the retaining pot 20. Similarly, an angled disc 36 is arranged between the retaining pot 20 and the rotating pot 23. This facilitates the slewing capability of the individual elements relative to one another because, through the mounting elements of the stop disc 35 and the angled disc 36, friction is reduced.

The retaining pot 20 comprises a radially extending circumferential wall 27 on whose inner side 27a a plurality of raceways 29 is formed. The non-slewing ramp disc (here, the first ramp disc 2) likewise has a pot-shaped configuration and thus also possesses a radially extending circumferential wall 31 on whose outer side 31a raceways 33 are configured. In the assembled state of the biasing device, the raceways 29 are arranged opposite the raceways 33. It is particularly advantageous if three raceways 29 and 33 respectively, are provided and arranged at an angle of 120° from one another. One rolling element 21 is arranged in each pair of the raceways 29 and 33.

The rotating pot 23 comprises a cylinder 23a which is configured and arranged around the axis 12 and comprises a plurality of contours 25. These contours 25 cooperate with corresponding contours 27 of the slewing ramp disc (here, the second ramp disc 5). In this way, a slewing motion of the rotating pot 23 is transmitted to a corresponding slewing motion of the second ramp disc 5.

The first ramp disc 2 and the second ramp disc 5 are preferably formed out of a sheet metal blank or a punched and stamped part and are produced by cold shaping. The retaining pot and the rotating pot 23 are also produced by a corresponding shaping method.

Figure 9:
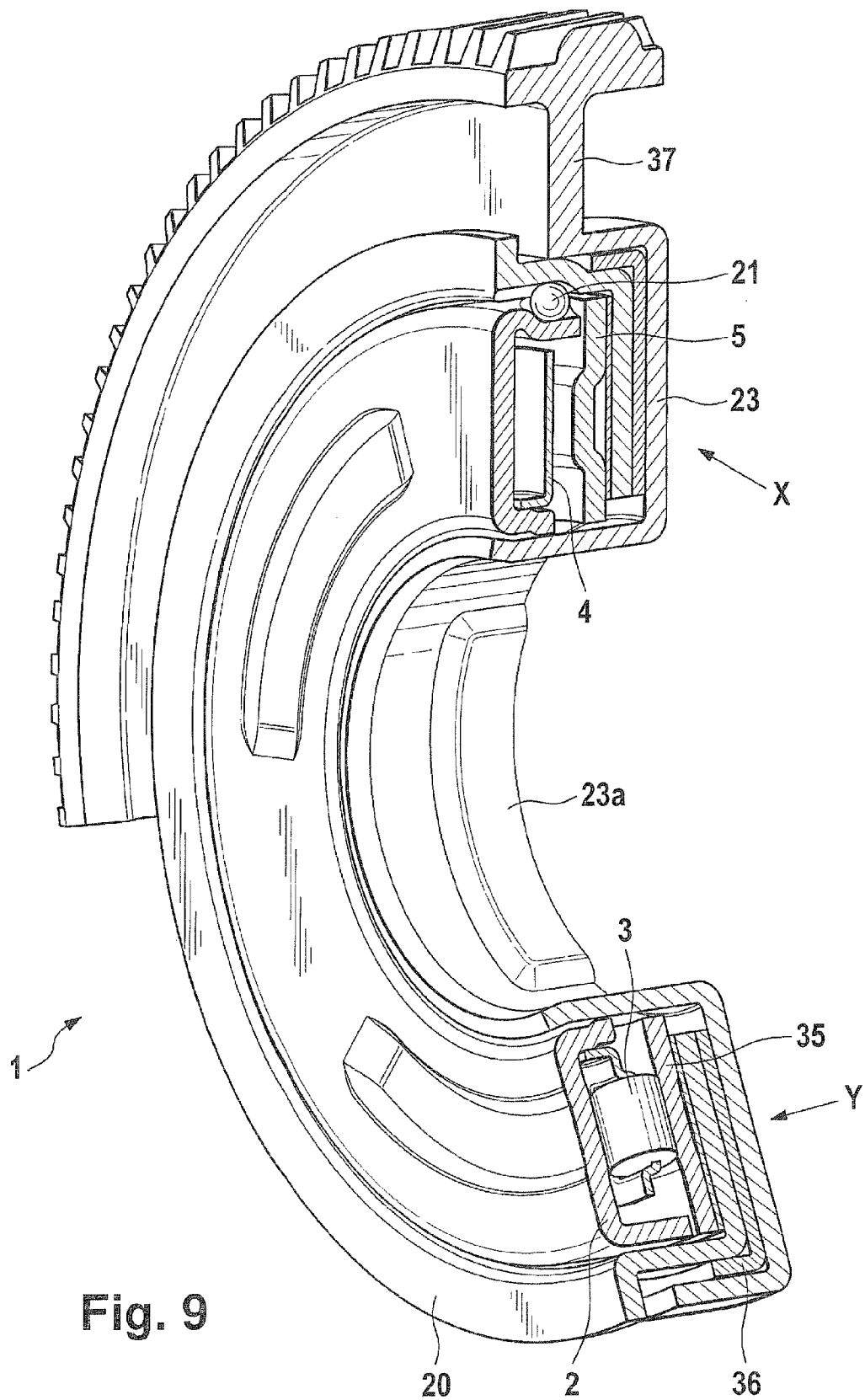
FIG. 9 shows a sectional view of the biasing device of the invention mounted together as a sub-assembly.

FIG. 9 shows a sectional view of the biasing device 1 of the invention mounted together as a sub-assembly. The rotating pot 23 with the centrally arranged cylinder 23 is configured so as to receive all the other components of the biasing device 1 and retain these components so that their respective moving ability is maintained. By other components is to be understood: the first ramp disc 2, the cage 4 with the rolling elements 3, the second ramp disc 5, the stop disc 35, the retaining pot 20 and the angled disc 36.

Figure 10:
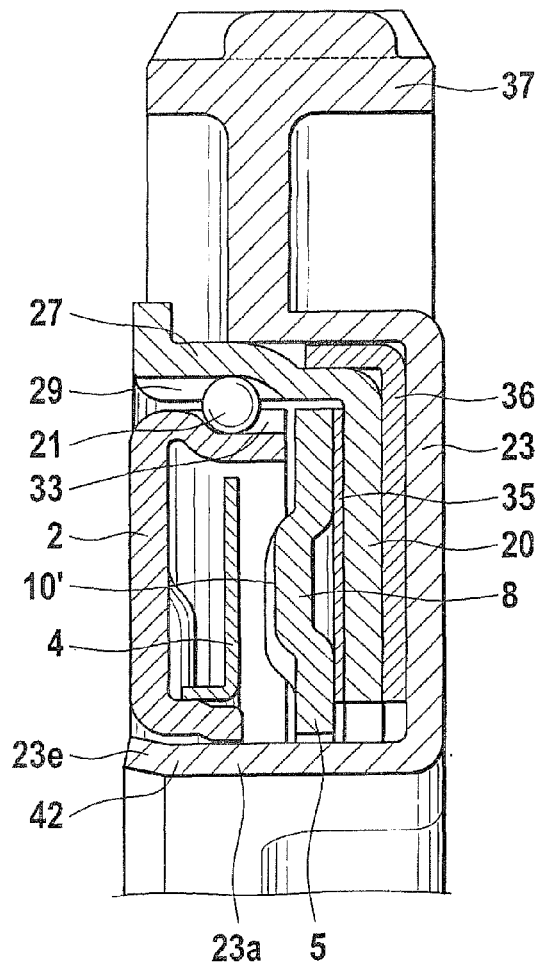
FIG. 10 shows a plan view of the parting face of the biasing device of the invention, identified at X in FIG. 9.
Figure 11:
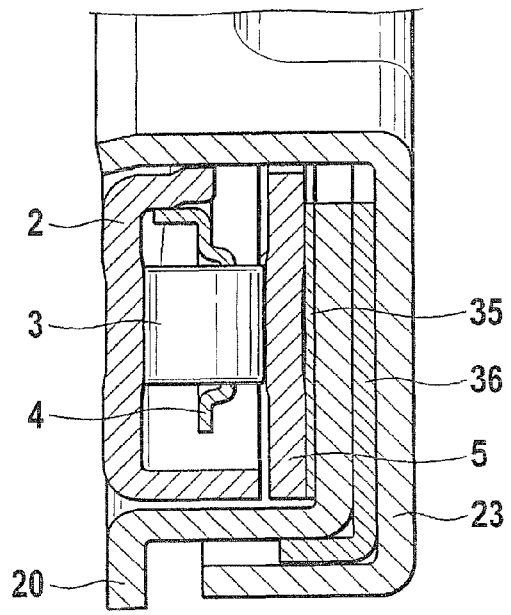
FIG. 11 shows a plan view of the parting face of the biasing device of the invention, identified at Y in FIG. 9.

FIG. 10 shows a plan view of the parting face of the biasing device 1 of the invention, identified at X in FIG. 9. Similarly, FIG. 11 shows a plan view of the parting face of the biasing device 1 of the invention, identified at Y in FIG. 9. On its free end 23e, the cylinder 23a formed on the rotating pot 23 comprises a calking 42 which secures the entire sub-assembly of the biasing device 1. Further perceptible from FIG. 10 is the interaction of the raceway 29 in the radially extending circumferential wall 27 of the retaining pot 20 with the raceway 33 in the radially extending circumferential wall 31 of the non-slewing ramp disc (in this form of embodiment, the first ramp disc 2). The rolling elements 21, preferably balls guided in the raceways 29 and 33, enable a linear guidance along the axis 12 of the biasing device 1 and prevent a twisting of the second ramp disc 2. One of the three rolling elements 3 carried by the cage 4 is visible in FIG. 11. The rolling elements 3 are arranged between the first and the second ramp disc 2 and 5 and run on the ramp contours 8 formed in the ramp discs.

FIG. 12 elucidates the principle of functioning of the biasing device 1 of the invention through actuation of the rotating pot 23. The cylinder gear of an electric motor (not illustrated) acts on the actuating element 37 of the rotating pot 23. This results in a direction of movement $T_{akt}$ out of the plane of projection. This movement is transmitted through the contours 25 on the cylinder 23a of the rotating pot 23 to the second ramp disc 5. The second ramp disc 5 rotates relative to the first ramp disc 2, and the rolling elements 3 descend along the ramp contours 8. The first ramp disc 2 is a non-slewing disc, so that it executes a movement in direction of the axis 12. The biasing device 1 thus also exerts a force $F_{ax}$ in axial direction. For facilitating the movement in direction of the axis 12, the roiling elements 21 run in the raceways 29 and 31.

FIG. 13 shows in a schematic illustration, the forces acting in the biasing device 1 of the invention. The force $F_t$ acts on the actuating element 37. This force $F_t$ is directed out of the plane of projection. The forces $F_L$ which act on the rolling elements 21 in the region of the raceways 29 and 31 neutralize each other. Similarly, the forces $F_{tR}$ in the region of the rolling elements between the first ramp disc 2 and the second ramp disc 5 also neutralize each other. A force $F_{NR}$ results from the stroke between the first ramp disc 2 and the second ramp disc 5.

FIG. 14 shows a schematic plan view of the biasing device 1 of the invention and of the active forces. The slewing or rotation of the rotating pot 23 is achieved through the action of a force $F_t$ on the actuating element 37. The rolling elements 3 between the first ramp disc 2 and the second ramp disc 5 are arranged in the cage 4 on a circle with the diameter $d_R$. The rolling elements 21 guided between the raceways 29 and 33 are arranged on a circle with the diameter $d_K$, $d_K$ being larger than $d_R$. A radial force $F_{tK}$ acts on the rolling elements 21. A force $F_{tH}$ acts on the retaining element 22 which is connected to the housing, not illustrated, and fixed on the retaining pot 20. This assures the anti-rotation feature of the retaining pot 20. The following equation is true for the forces prevailing in the biasing device:

$$F_{tK} < F_{tR} \ll F_{NR}$$

The invention has been described with reference to a preferred form of embodiment. For a person skilled in the art it is obvious that modifications and deviations from the invention are possible without departing from the scope of protection of the claims that follow.

The invention claimed is:

1. A biasing device, comprising:
a first ramp disc and a second ramp disc, a plurality of ramp contours being configured in one side of an annular surface of each of said ramp discs,
a plurality of rolling elements arranged between the ramp contours of the first ramp disc and of the second ramp disc such that, within the biasing device, through a slewing of one of the two ramp discs about an axis relative to a respective other one of the ramp discs which is a non-slewing disc, the rolling elements ascend and/or descend along the ramp contours, the rolling elements being retained for rolling in a cage, and
a retaining pot connected to a housing through at least one retaining element such that the retaining pot is fixed with respcet to rotation relative to the housing, wherein at least the first ramp disc, the cage and the second ramp disc are inserted into the retaining pot and, for providing axial guidance, a plurality of rolling elements is arranged between the retaining pot and the non-slewing ramp disc, and
wherein at least the first ramp disc, the cage, the second ramp disc and the retaining pot are inserted into a rotating pot that cooperates with the slewing ramp disc.

2. A biasing device according to claim 1, wherein the rotating pot comprises a plurality of contours that cooperate with corresponding contours of the slewing ramp disc.

3. A biasing device according to claim 2, wherein the contours of the rotating pot have a wedge-shaped configuration.

4. A biasing device according to claim 1, wherein the retaining pot is configured with a radially extending circumferential wall in which a raceway is configured for each of the rolling elements, and that the non-slewing ramp disc is likewise configured with a radially extending circumferential wall in which a raceway is likewise configured for each of the rolling elements, so that the non-slewing ramp disc and the retaining pot are axially movable relative to each other.

5. A biasing device according to claim 4, wherein the raceways in the radially extending circumferential wall of the retaining pot and the raceways in the radially extending circumferential wall of the non-slewing ramp disc are arranged equally spaced from one another.

6. A biasing device according to claim 4, wherein three raceways are provided in each of said walls, one rolling element in form of a ball being guided in each of said raceways.

7. A biasing device according to claim 1, wherein a stop disc is arranged between the slewing ramp disc and the retaining pot, and an angled disc is arranged between the retaining pot and the rotating pot.

8. A biasing device according to claim 1, wherein an actuating element is configured on the rotating pot and enables the rotating pot to pivot about the axis.

9. A biasing device according to claim 8, wherein the actuating element is a toothed rack element.

10. A biasing device according to claim 1, wherein each ramp contour comprises a first ramp and a second ramp.

11. A biasing device according to claim 1 wherein each ramp contour is configured with a substantially uniform running surface that has a constant inclination with respect to the axis.

12. A biasing device according to claim 1, wherein each ramp contour is configured with a substantially uniform running surface that has a variable inclination with respect to the axis.

13. A biasing device according to claim 11, wherein the running surfaces comprise an initial contact point and an end contact point for the rolling elements, an end stop for the rolling elements being formed at the end contact point.

14. A biasing device according to claim 13, wherein the end stop is configured at the lowest point of the raceway.

15. A biasing device according to claim 1, wherein three rolling elements are arranged uniformly spaced from one another between the two ramp discs, each of the two ramp discs being configured with three ramp contours.

16. A biasing device according to claim 1, wherein the two ramp discs are components made by cold shaping out of a sheet metal blank, cold shaping of the sheet metal blank forms the ramp contours and the running surfaces for the rolling elements and cold shaping further forms on the non-slewing ramp disc, the radially extending circumferential wall and the raceways for the rolling elements.

17. A biasing device according to claim 1, wherein the retaining pot and the rotating pot are components made by cold shaping out of a sheet metal blank.

18. A biasing device according to claim 16, wherein the components of the ramp contours are hardened for rolling contact at least on the running surface for the rolling elements.

19. A biasing device according to claim 16, wherein the material of the sheet metal blanks is a cold-forming steel of the "16 MnCr 5" type.

20. A biasing device according to claim 16, wherein the material of the sheet metal blanks is a cold-forming steel of the "C45" type, the shaped sheet metal blanks being hardenable for the mechanical loading in the biasing device.

21. A biasing device according to claim 1, wherein the rolling elements between the first and the second ramp disc are configured as rollers.

22. A biasing device according to claim 1, wherein the rolling elements between the first and the second ramp disc are configured as frustums of a cone.

23. A biasing device according to claim 1, wherein the first ramp disc, the cage, the second ramp disc, the stop disc, the retaining pot, the angled disc and the rotating pot of the biasing device are mounted together to form a pre-assembled unit.

24. A biasing device according to claim 23, wherein the non-slewing ramp disc is fixed relative to the rotating pot in direction of the axis by a calking.

25. Use of the biasing device according to claim 1 in double clutches and/or differentials with torque vectoring and/or in power dividers.

\* \* \* \* \*